United States Patent [19]

Tachibana et al.

[11] Patent Number: 4,543,577

[45] Date of Patent: Sep. 24, 1985

[54] MOVING OBSTACLE DETECTION SYSTEM FOR A VEHICLE

[75] Inventors: Akira Tachibana, Yokosuka; Norio Fujiki, Yokohama; Hiroshi Endo, Yokosuka; Kiyoshi Yamaki; Norimasa Kishi, both of Yokohama, all of Japan

[73] Assignee: Nissan Motor Company, Limited, Yokohama, Japan

[21] Appl. No.: 388,704

[22] Filed: Jun. 15, 1982

[30] Foreign Application Priority Data

Jun. 22, 1981 [JP] Japan .................................. 56-96349
Jun. 19, 1981 [JP] Japan ............................. 56-91503[U]
Jul. 14, 1981 [JP] Japan ........................... 56-103453[U]

[51] Int. Cl.$^4$ ........................ G08G 1/00; G01S 13/00; G01S 15/93
[52] U.S. Cl. ................................... 340/904; 340/901; 343/7 VM; 367/909; 367/112
[58] Field of Search ................................ 340/901–904, 340/53, 52 H; 343/7 VM, 8; 367/909, 112, 126; 180/169

[56] References Cited

U.S. PATENT DOCUMENTS

| | | | |
|---|---|---|---|
| 3,761,925 | 9/1973 | Bollard | 343/8 |
| 3,778,823 | 12/1973 | Sato | 343/7 VM |
| 3,978,481 | 8/1976 | Angwin | 343/7 VM |
| 4,240,152 | 12/1980 | Duncan | 340/901 |
| 4,349,823 | 9/1982 | Tagami | 340/904 |

FOREIGN PATENT DOCUMENTS 78190 12/1970 German Democratic Rep.
2734998 2/1978 Fed. Rep. of Germany.
2317384 6/1978 Fed. Rep. of Germany.

OTHER PUBLICATIONS

*Microwave Journal*, WU et al., Nov. 1977, p. 39–42, 59.
*Electrical Communication*, Heiden ETA, vol. 52, No. 2, 1977, p. 141–145.
*Radio Electronics*, Weinstein, Jul. 1977, p. 44–46.

Primary Examiner—James J. Groody
Attorney, Agent, or Firm—Lowe, King, Price & Becker

[57] ABSTRACT

A moving obstacle detection system for an automotive vehicle utilizing a doppler effect of the transmitted wave against an obstacle which runs in front of the vehicle such as another vehicle. The system generally comprises: (a) a doppler radar unit which operates so as to produce a doppler signal when the vehicle is halted; (b) a detecting means which detects the changing phase of a doppler signal produced from the doppler signal; (c) a discriminating means which discriminates the departure of another vehicle from the front area of the vehicle and the intersection of another vehicle or pedestrian traverse to the vehicle on a basis of the frequency changing rate or amplitude level changing rate of the detected doppler signal; and (d) an alarm unit which produces an alarm in a predetermined form only when the departure of another vehicle from the front detection area of the doppler radar unit or in the case when another vehicle straightly approaches or departed from the vehicle and in the case when another vehicle or pedestrian goes across the vehicle, separately from each other.

21 Claims, 14 Drawing Figures

ABOUT 10 SECONDS

1~2 SECONDS

MOVING OBSTACLE DETECTION SYSTEM FOR A VEHICLE

BACKGROUND OF THE INVENTION

Field of the Invention

The present invention relates to a system which informs a vehicle driver that another vehicle or pedestrian (moving obstacle) is approaching or departing from a front space of the vehicle upon the detection of a frequency deviation between radiated and reflected electric or ultrasonic waves against the vehicle or pedestrian which is running.

SUMMARY OF THE INVENTION

It is an object of the present invention to provide a system for detecting and informing a vehicle driver that another vehicle or pedestrian is approaching or departing from a front area of the vehicle, wherein the system does not inform that another vehicle or pedestrian runs of walks slowly across the vehicle, e.g., in a case when the vehicle is standing in an intersection.

It is another object of the present invention to provide a system for informing the vehicle driver in a predetermined form that another vehicle has departed from the front position of the vehicle, for distinguishedly informing the vehicle driver that another vehicle is approach the vehicle, e.g., backward approaching of the other vehicle associated with a slow depression of a brake pedal by the other vehicle driver at an ascending slope, forward approaching of the other vehicle with a slow depression of a brake pedal by the vehicle driver at a descending slope, and backward departure of the vehicle with a slow depression of the brake pedal by the vehicle driver at the ascending slope.

BRIEF DESCRIPTION OF THE DRAWINGS

The features and advantages of the present invention will be appreciated from the following description and drawings in which like reference numerals designate corresponding elements and in which.

DETAILED DESCRIPTION OF THE PREFERRED EMBODIMENTS

Reference will be made to the drawings and first to FIG. 1 which shows a first preferred embodiment of a doppler radar type moving obstacle detection system mounted in a vehicle.

Figure 1:
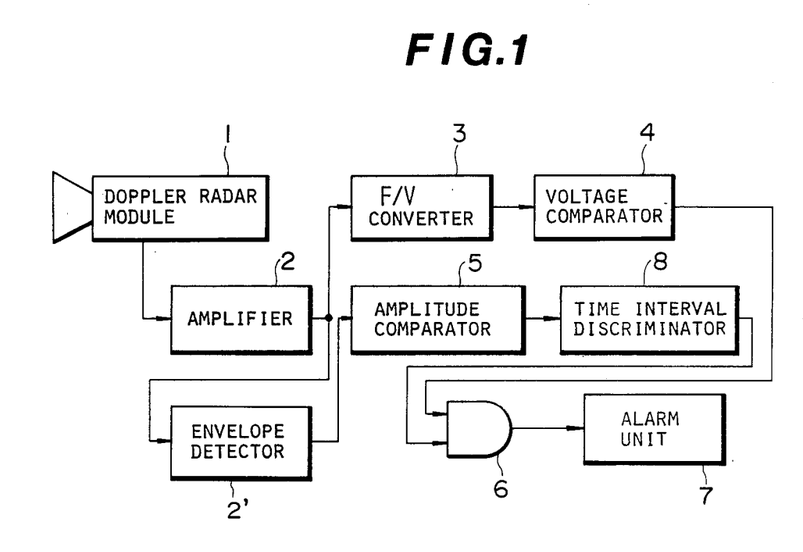
FIG. 1 shows a circuit block diagram of a doppler radar moving obstacle detection system in a first preferred embodiment according to the present invention.

In FIG. 1, numeral 1 denotes a doppler radar module having a transceiver and directive antenna which transmits, e.g., an electric wave having a high frequency $f_1$ for a detection area in front of the vehicle, receives a reflected wave having a frequency $f_2$ reflected from a moving obstacle, e.g., another vehicle presently in the detection area of the vehicle in which the doppler radar module is mounted, and outputs a doppler signal having a beat frequency indicating the frequency difference between the transmitted wave and reflected wave $|f_1 - f_2|$. It should be noted that the doppler radar module 1 operates only when the first vehicle stops. Numeral 2 denotes an amplifier connected to the doppler radar module 1 which amplifies the doppler signal received from the doppler radar module 1. Numeral 2' denotes an envelope detector which receives and detects (modulates) the amplified doppler signal to produce a unidirectional envelope of the doppler signal. Numeral 3 denotes a frequency-to-voltage converter (hereinafter referred to simply as an F/V converter) connected to the amplifier 2 which converts the received frequency of the amplified doppler signal into a corresponding voltage signal. Numeral 4 denotes a first comparator which compares the voltage signal received from the F/V converter 3 with a reference voltage and outputs a voltage signal when the voltage signal from the F/V converter 3 exceeds the reference voltage, i.e., when the relative speed of another vehicle to be detected which is departing from or is approaching the vehicle exceeds a predetermined value. It should be noted that a vehicle in which the doppler radar moving obstacle detection system according to the present invention is mounted is hereinafter referred to simply as a first vehicle and another vehicle (moving obstacle) in front of the first vehicle which departs from the front detection area of the first vehicle is hereinafter referred simply to as a second vehicle.

Numeral 5 denotes an amplitude comparator which outputs a high-level voltage signal when the amplitude of the envelope signal exceeds another predetermined value (threshold value). Numeral 6 denotes a first AND gate circuit. Numeral 7 denotes an alarm unit which produces an alarm in a predetermined form to the first vehicle driver. Numeral 8 denotes a time interval discriminator which outputs a high-level voltage signal when the high-level voltage signal from the amplitude comparator 5 continues for a fixed time interval. The reason that the time interval discriminator 8 is provided is described hereinbelow. For example, when the first vehicle halts at a head of a lane in a pedestrian crossing, many second vehicles cross the front side of the first vehicle. At this time, the doppler radar module 1 outputs repetitively the doppler signal having a high frequency and large amplitude so that the alarm unit 7 produces the alarm in the predetermined form if the frequency detected by the F/V converter 3 and peak value detected by the amplitude comparator 5 exceed the respective predetermined thresholds. Therefore, the system provides an erroneous detection and information for the vehicle driver. The time interval of the time-interval discriminator 8 can thus be set arbitrarily. However, the time interval in which a pedestrian walks at a normal step and goes across the front side of the first vehicle in a pedestrian crossing is about two seconds supposing that an average walking speed of the pedestrian is four kilometers per hour and average width of the first vehicle is about 1.5 meters. Therefore, the fixed time interval of the time interval discriminator 8 may preferably be about three seconds. The time interval discriminator 8 comprises, e.g., a monostable multivibrator having an output signal duration of about three seconds, an inverter connected to the monostable multivibrator, and an AND gate circuit connected to the inverter and to the amplitude comparator 5. It should be noted that when the time interval is determined in such a way as described hereinabove, the alarm is not produced for about three seconds when the second vehicle in front of the first vehicle has departed forwardly from the first vehicle. However, a vehicle driver of a vehicle which stands in the rear of the first vehicle waiting for the first vehicle to start may not sound a horn since the order of the time interval is very short.

As described hereinbefore the doppler radar type moving obstacle detecting and informing system in the first preferred embodiment does not produce an alarm to the first vehicle driver when the amplitude of the doppler signal above the predetermined value continues for the predetermined interval of time. Therefore, an erroneous alarm cannot be produced, e.g. in such a case when the second vehicle goes across the front side of the first vehicle in view of the time it takes for a pedestrian or another vehicle to go across the first vehicle.

Figure 2A:
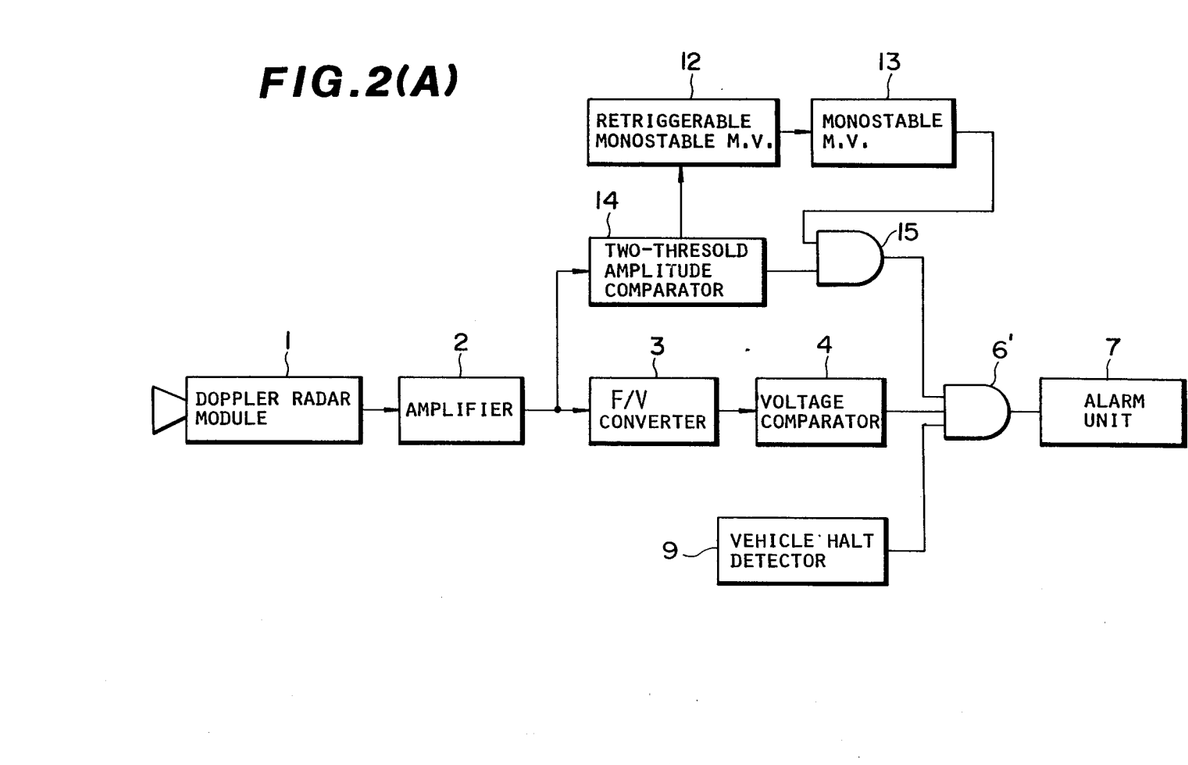
FIGS. 2A and 2B show circuit block diagrams of the doppler radar moving obstacle detection system in a second preferred embodiment according to the present invention.
Figure 2B:
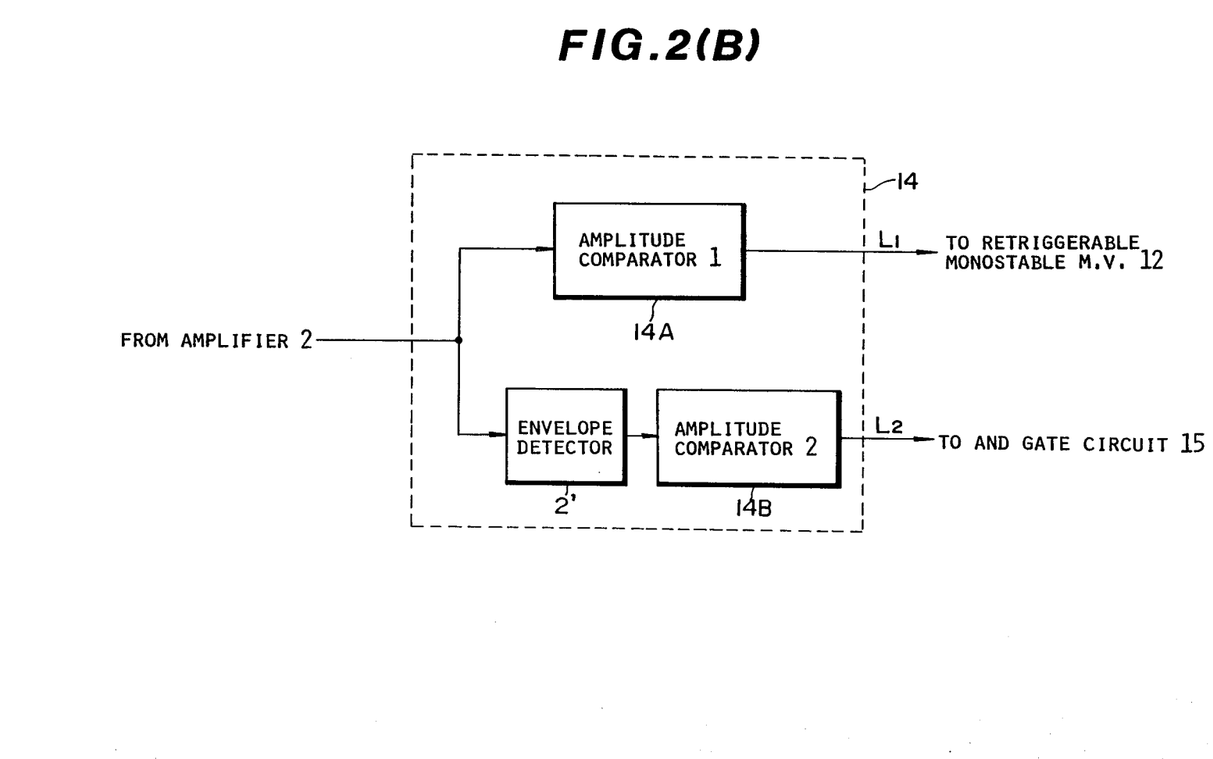

FIGS. 2A and 2B show a second preferred embodiment according to the present invention.

In FIG. 2A, numeral 9 denotes a vehicle halt detector which outputs a high-level voltage signal when the first vehicle halts. The vehicle halt detector 9 includes a vehicle speed sensor, side brake actuator, or etc., assembled so as to detect the halt state of the vehicle.

Figure 4A:
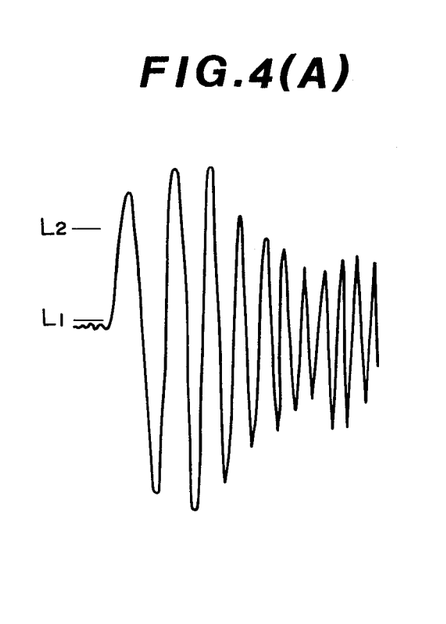
FIGS. 4(A) and 4(B) show respective waveforms of a doppler signal outputted from a doppler radar module, representing the different situations of another vehicle or pedestrian with respect to the vehicle.
Figure 4B:
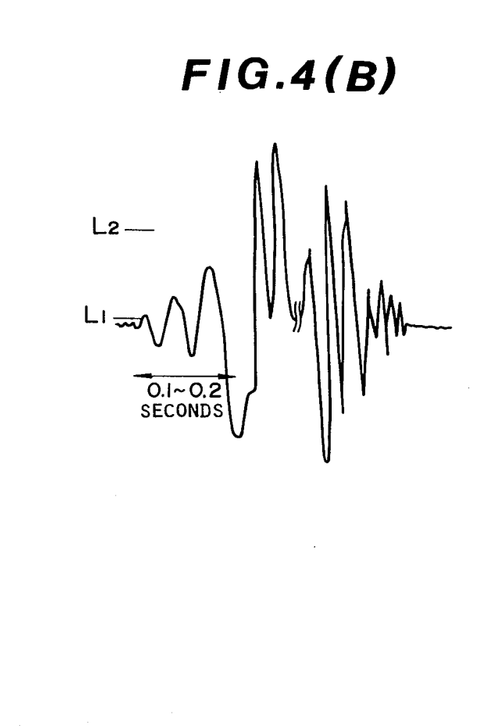

Numeral 14 denotes an amplitude comparator having two different threshold values which judges whether the doppler signal starts outputting from the doppler radar module 1 by means of a first low threshold value thereof $L_1$ and judges whether the amplitude level of the amplified doppler signal exceeds a second high threshold value thereof $L_2$ so as to inform the first vehicle driver that the second vehicle moves forward or backward with respect to the first vehicle. These two threshold values are shown in FIGS. 4(A) and 4(B). When the amplitude level of the amplified doppler signal exceeds the first low threshold level $L_1$, the two-threshold amplitude comparator 14 triggers a retriggerable monostable multivibrator 12. When the amplitude level of the amplified doppler signal furthermore exceeds the second high threshold level $L_2$, the two-threshold amplitude comparator 14 outputs a high-level voltage signal into another AND gate circuit 15. Therefore, if the high-level voltage signal is outputted from the two-threshold amplitude comparator 14 into the AND gate circuit 15 together with the monostable multivibrator 13 outputting a high-level voltage signal into the AND gate circuit 15 whose width corresponds to a set time interval thereof, e.g., 0.2 seconds, the intersection of the second vehicle through the front detection area is not indicated to the vehicle driver through the alarm unit 7 because of the different waveforms of the doppler signal as shown in FIGS. 4(A) and 4(B).

Figure 3A:
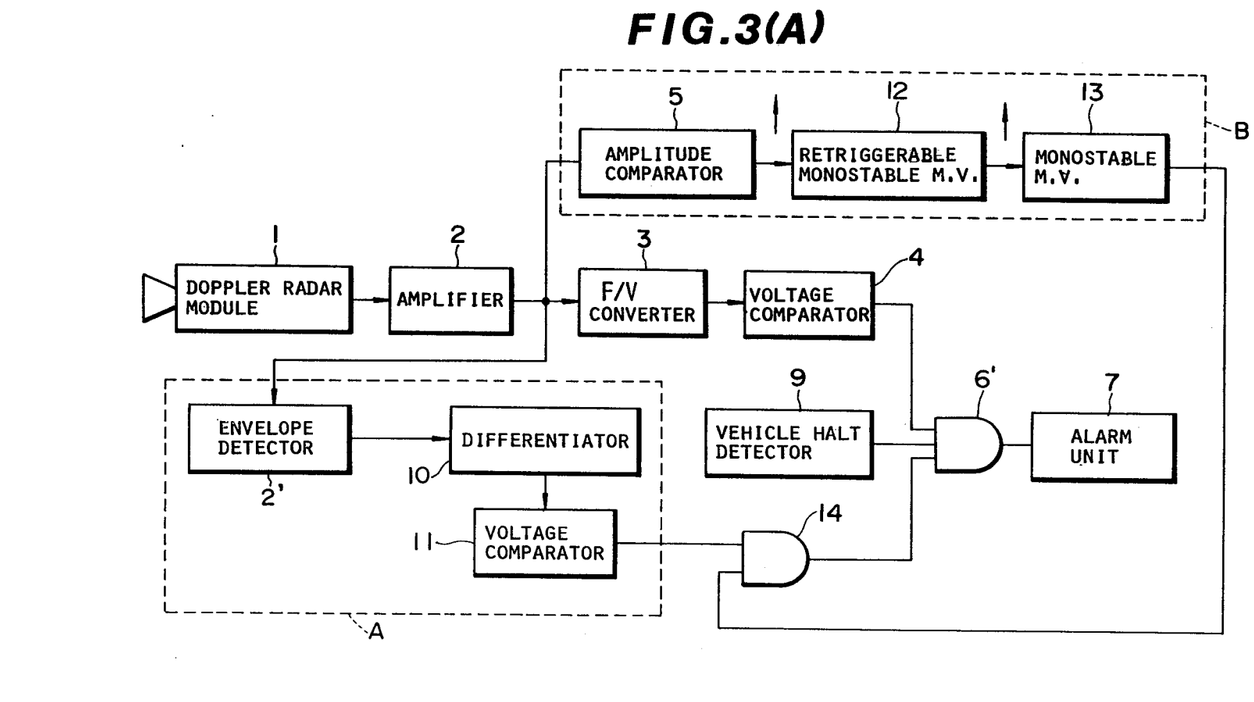
FIG. 3(A) shows a circuit block diagram of the doppler radar moving obstacle detection system in a third preferred embodiment according to the present invention.

FIG. 3(A) shows a third preferred embodiment of the doppler radar moving obstacle detection system.

In FIG. 3(A), the amplified doppler signal is sent into a differentiator 10 through the envelope detector 2'. The differentiator 10 differentiates a unidirectional envelope of the amplified doppler signal so as to detect the level change rate of the unidirectional envelope produced by the envelope detector 2', i.e., the rate of amplitude level of the amplified doppler signal with respect to time. A voltage comparator 11 subsequent to the differentiator 10 compares the differentiated voltage signal from the differentiator 10 with a reference voltage to judge whether the change rate of the amplitude level of the amplified doppler signal exceeds a predetermined value.

The envelope detector 2', differentiator 10, and the voltage comparator 11 constitute an amplitude changing rate judging unit A for judging whether the second vehicle is approaching from any direction to the front detection area of the doppler radar or departing from the area toward any direction.

Furthermore, in FIG. 3(A), an amplitude comparator 5, retriggerable monostable multivibrator 12, and monostable multivibrator 13 constitute a timer unit B which sets an interval of time for enabling the amplitude changing rate judging unit A in response to the appearance of the doppler signal. The amplitude comparator 5 receives and compares the amplified doppler signal with a reference voltage to detect that the doppler signal begins to appear then outputs a pulse signal when the amplified doppler signal exceeds the reference voltage. Although the waveform of the amplified doppler signal is a sinusodial the pulse signal is outputted in the form of a short-interval pulse train. The retriggerable monostable multivibrator 12 is triggered on the rising edge of one pulse signal fed from the amplitude comparator 5 which is first inputted thereinto and retriggered by other subsequently inputted pulse signals of pulse train from the amplitude comparator 5 whose width is shorter than a set interval of the retriggerable monostable multivibrator 12 so that a single moving obstacle can be observed. It should be noted that the set interval of time of the retriggerable monostable vibrator 12 is longer than a longest period of time (0.1 seconds) the doppler signal can have. An elongated pulse signal from the retriggerable monostable multivibrator 12 is fed into the monostable multivibrator 13. The monostable multivibrator 13 outputs a high-level voltage signal having a predetermined pulse width corresponding to the set interval of time, e.g., 0.2 seconds on a rising edge of the elongated pulse signal fed from the retriggerable multivibrator 12. The output high-level voltage signal from the monostable multivibrator 13 is fed into an AND gate circuit 14 so as to enable the pssage of the high level voltage signal outputted from the voltage comparator 11 through the AND gate circuit 14. Since the waveform of the doppler signal that appears as shown in FIG. 4(A) when the second vehicle departs straightly from the front detection area of the first vehicle or approaches straightly to the area is different from that shown in FIG. 4(B) for 0.1 through 0.2 seconds from the appearance of the doppler signal when the second vehicle goes across the direction area, the high-level voltage signal from the AND gate circuit 14 is outputted only in the former case described above.

Figure 3B:
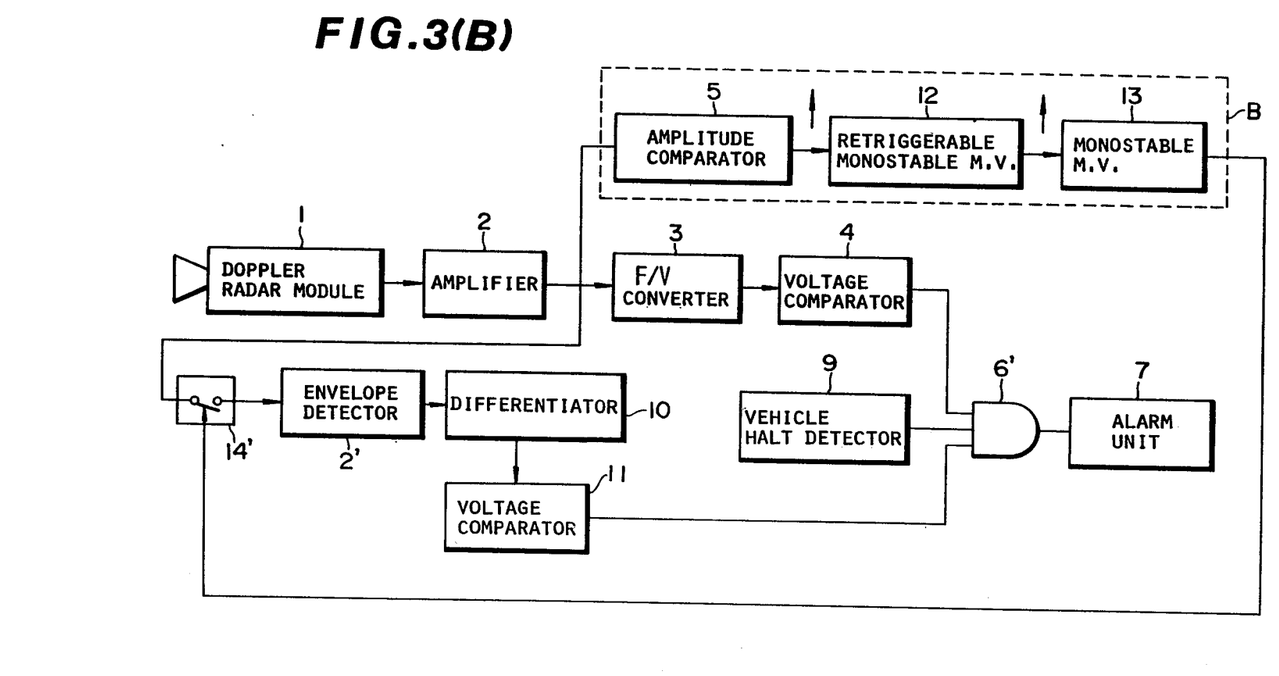
FIGS. 3(B) and 3(C) show alternatives of the doppler radar moving obstacle detection system shown in FIG. 3(A)
Figure 3C:
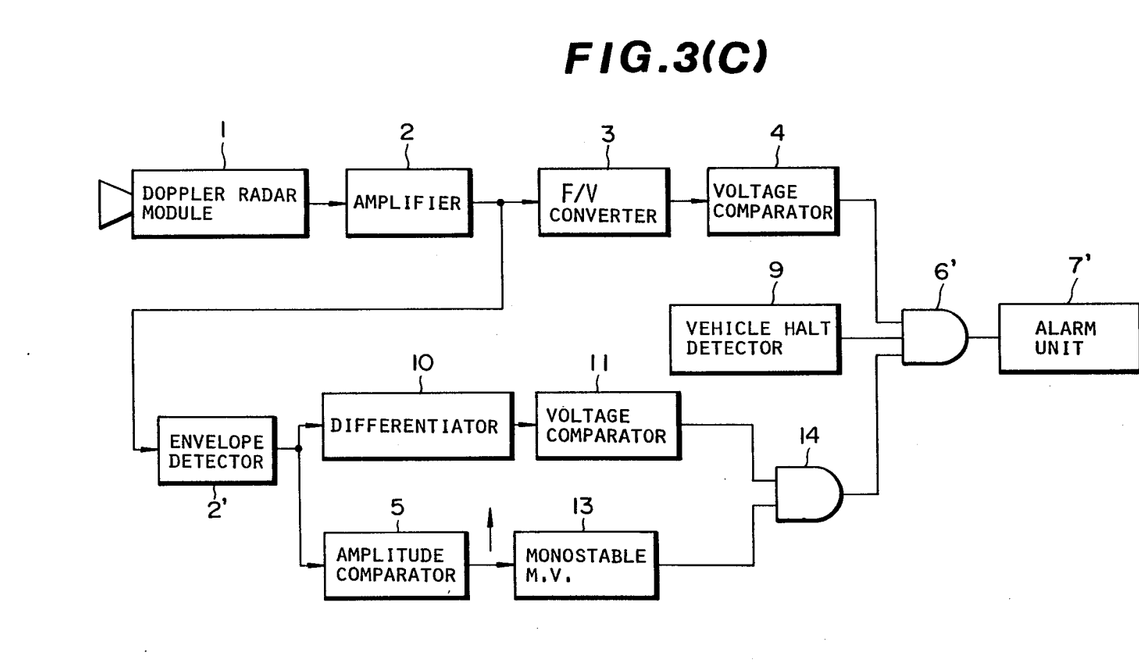

FIGS. 3(B) and 3(C) show alternatives of the doppler radar moving obstacle detecting and informing system shown in FIG. 3(A).

As shown in FIG. 3(B), an analog switch 14' is provided instead of the AND gate circuit 14 shown in FIG. 3(A) between the amplifier 2 and envelope detector 2' of the amplitude level changing rate judging unit A so as to enable the passage of the amplified doppler signal therethrough into the envelope detector 2' only when the high-level voltage signal is received from the monostable multivibrator 13 of the timer unit B.

As shown in FIG. 3(C), on the other hand, the envelope detector 2' is also connected to the amplitude comparator 5 in parallel with the differentiator 10. Therefore, since the output pulse signal of the amplitude comparator 5 is the same form of the retriggerable monostable multivibrator 12 shown in FIGS. 3(A) and 3(B), there is no need of providing the retriggerable monostable multivibrator 12.

Consequently, an accurate and appropriate detection and information can be carried out, with the indication of the intersection of the second vehicle across the first vehicle excluded.

Figure 5:
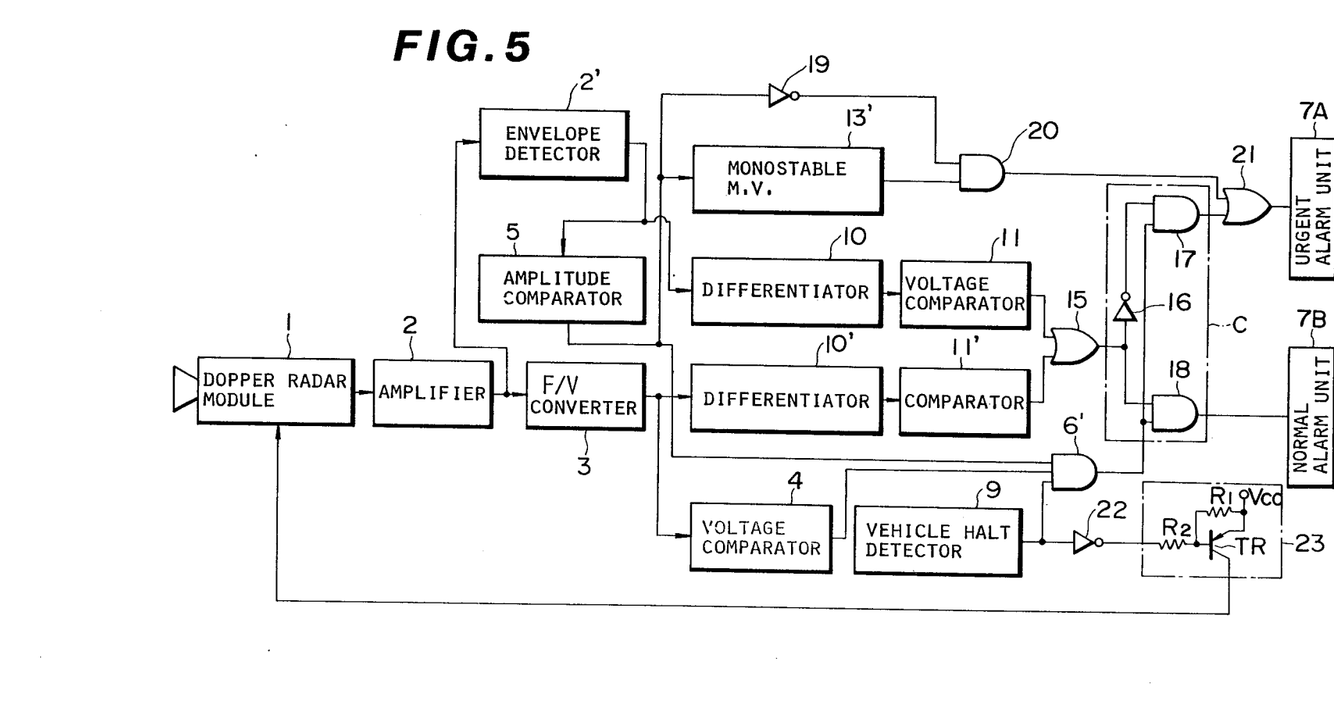
FIG. 5 shows a circuit block diagram of the doppler radar moving obstacle detection system of a fourth preferred embodiment according to the present invention.

FIG. 5 shows a fourth preferred embodiment of the doppler radar moving obstacle detection system.

In FIG. 5, numeral 7A denotes an urgent alarm unit which produces an alarm in a predetermined form to the driver of the first vehicle and to the other drivers of the second vehicles, i.e., the driver of a second vehicle presently in front of the first vehicle and approaching to the first vehicle, a driver of the second vehicle presently in front of the first vehicle and approaching straightly at an adjacent traffic lane, and the driver of another vehicle which approaches the first vehicle at the rear of the first vehicle, at the time of the approach of the second vehicle toward the first vehicle and intersection of another person at the front space of the first vehicle. The predetermined form described above includes, e.g., a buzzer which sounds only under such situations as described above, a vocal warning device which warns such drivers as described above in a vocal form such as "Depress the brake pedal", or a combination of these indication forms. Numeral 7B denotes a normal alarm unit which produces an alarm in another predetermined form such as a sound of chime or speech that the front car has started.

The differentiator 10, connected to the envelope detector 2°, differentiates the envelope wave produced on a basis of the doppler signal fed from the doppler radar module 1 through the amplifier 2 so as to detect the change rate of the amplitude level of the doppler signal. The voltage comparator 11 connected to the differentiator 10 compares the differentiated wave received from the differentiator 10 with a reference voltage so as to detect the changing rate of the amplitude level of the doppler signal which exceeds a predetermined value. Hence, the envelope detector 2', differentiator 10, and comparator 11 constitute the amplitude level changing rate judging unit A as described hereinbefore with reference to FIG. 3(A).

In addition, another differentiator 10', connected to the F/V converter 3, differentiates the analog voltage signal from the F/V converter 3 in proportion to the frequency of the doppler signal so as to detect the frequency change rate with respect to time. The comparator 11' connected to the differentiator 10' compares the differentiated signal from the differentiator 10' with a reference voltage so as to detect whether the frequency change rate with respect to time exceeds a predetermined value. The differentiator 10' and comparator 11' constitute a frequency change rate judging unit. The output terminals of these two comparators 11 and 11' are connected to an OR gate circuit 15.

An inverter 16, and gate circuits 17 and 18 constitute a selection circuit block C which drives the normal alarm unit 7B when a high-level voltage signal is outputted from an AND gate circuit 6' (described herein is based on a positive logic system) and simultaneously a high-level voltage signal to indicate the detection of excessive frequency change rate or amplitude change rate described hereinbefore is outputted from the OR gate circuit 15. The selection circuit block C also drives the urgent alarm unit 7A when a low-level voltage signal is outputted from the OR gate circuit 15 together with a high-level voltage signal outputted from the AND gate circuit 6'.

The AND gate circuit 6' is connected to the amplitude comparator 5, voltage comparator 4, and vehicle halt detector 9. The amplitude comparator 5 is connected to the amplifier 2 through the envelope detector 2'. The voltage comparator 4 is connected to the F/V converter 3. Each function of these circuits is already described hereinabove.

In this way, the contents of information is changed depending on whether the amplitude level changing rate or frequency changing rate exceeds each predetermined value, so that an appropriate alarm indication to the driver(s) can be made which distinguishedly informs the driver(s) that a vehicle in front of the first vehicle has started forward and that the vehicle in front of the first vehicle has departed from or approached to the front side of the first vehicle under other situations described hereinafter.

Figure 6:
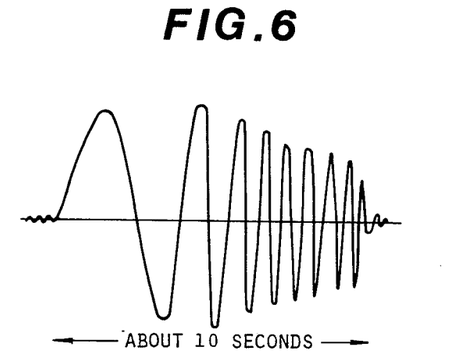
FIG. 6 shows a waveform of the doppler signal outputted from the doppler radar module when another vehicle, located in front of the vehicle in which the system according to the present invention is mounted, has started.
Figure 7:
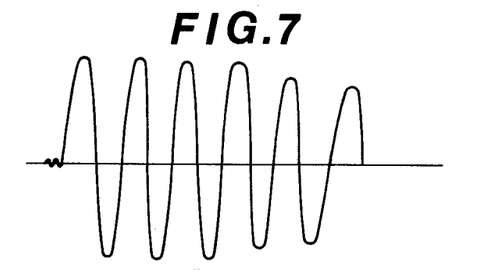
FIG. 7 shows a waveform of the doppler signal when the vehicle in which the system according to the present invention is mounted is slowly departing from another vehicle which is moving in front of the vehicle.

In more details, as shown in FIGS. 6 and 7 the doppler signal waveform typically shown in FIG. 6 is observed when the second vehicle in front of the halted first vehicle has started away from the first vehicle. This waveform is such that the amplitude level is damped at a relatively rapid rate according to the acceleration of the second vehicle and the frequency becomes higher at a relatively rapid rate since the doppler signal frequency indicates the absolute frequency difference between the transmitted wave of the fixed frequency and reflected wave whose frequency becomes lower as the distance between the first and second vehicles becomes longer.

On the other hand, the doppler signal waveform typically shown in FIG. 7, observed when the first vehicle relatively withdraws from the second vehicle at a slow speed, is such that the amplitude level of the doppler signal is gradually increased or decreased and the frequency thereof changes at a slow rate. Hence, in the former case after either the amplitude level changing rate or the frequency changing rate is checked to see that the rate exceeds the corresponding predetermined value, the normal alarm unit 7B is actuated to produce the alarm in the predetermined form. In the latter case, the urgent alarm unit 7A is actuated so as to warn the first vehicle driver, second vehicle driver(s), and so on to prevent the second vehicle from the contact or collision with the first vehicle.

If an AND gate circuit is connected to the two voltage comparators 11 and 11' in place of the OR gate circuit 15, this AND gate circuit outputs a high-level voltage signal only when both the amplitude level and frequency changing rates exceed the respective predetermined values. In this case, the collision with another vehicle can be prevented more positively.

Figure 8:
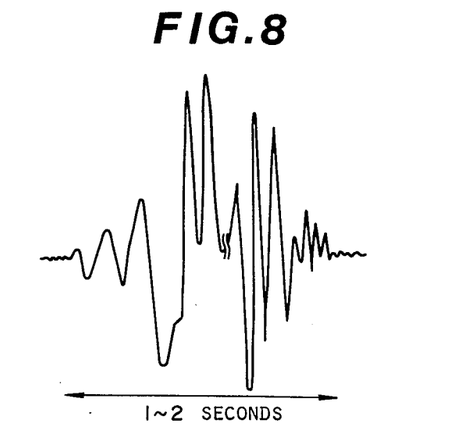
FIG. 8 shows a waveform of the doppler signal when a pedestrian goes across the front position of the vehicle in which the system according to the present invention is mounted.

In addition, as shown in FIG. 5 the monostable multivibrator 13' is connected to the amplitude comparator 5 in parallel with an inverter 19. The monostable multivibrator 13' is triggered on the rising edge of the output high-level voltage signal from the amplitude comparator 5 wherein the amplitude of the doppler signal is checked to see that the amplitude exceeds the predetermined value. The monostable multivibrator 13' sends a high voltage pulse whose width is predetermined in response to the high-level voltage signal from the amplitude comparator 5 into an AND gate circuit 20 together with the output of inverter 19. Therefore, the high-level voltage signal of the AND gate circuit 20 is outputted only when the interval of time within which the amplitude level of the doppler signal exceeds the predetermined value by means of the amplitude comparator 5 is shorter than that predetermined by the monostable multivibrator 13'. The high-level voltage signal from the AND gate circuit 20 is fed into the urgent alarm unit 7A through another OR gate circuit 21. The inverter 19, monostable multivibrator 13', and AND gate circuit 20 are provided for urgently alarming the first vehicle driver, the opposing vehicle driver running at a different traffic line, and/or the driver of the vehicle following the first vehicle that a pedestrian walks or runs across the front direction of the first vehicle. In this case, the doppler signal waveform appears as shown in FIG. 8. It will be appreciated that the interval of time within which the amplitude level becomes high is very short as compared with the duration of the doppler signal, i.e., 1 through 2 seconds. On the other hand, the doppler signal duration for a single second vehicle in the case when the second vehicle advances from the front direction area of the first vehicle is several through several tens seconds as shown in FIG. 6. Therefore, if the interval of time, i.e., the output pulse duration of the monostable multivibrator 13' is set longer than two seconds, the indication that the pedestrian walks or runs across the first vehicle described above can be made through the urgent alarm unit 7A. Consequently a traffic accident can be prevented. The incorporation of such circuit blocks into the system is effective when the first vehicle fails to recognize a pedestrian on a street when he starts the first vehicle or when the other drivers of the opposing vehicles at different traffic lanes and of the vehicle following the first vehicle cannot perceive a pedestrian who is being interrupted by the first vehicle. Instead of the amplitude comparator 5, the input terminals of the inverter 19 and monostable multivibrator 13' may be connected in parallel with the input terminal of voltage comparator 4. Furthermore, the output terminal of the AND gate circuit 20 together with the inverter 19 and monostable multivibrator 13' may be connected to another alarm unit used exclusively for alarming only when a pedestrian goes across the front side of the first vehicle. For example, an indicator is equipped at the rear of the first vehicle to indicate that a person goes across the street. Therefore, the indicator lamp, upon reception of the high-level voltage signal from said AND gate circuit 20, is lighted or blinked. For the opposing vehicles at different traffic lanes, the alarm unit comprises a special horn, light, right side direction indicator, or four-way flasher, etc. For the first vehicle, a vocal warning system may be used as the urgent alarm unit 7A.

Furthermore, as shown in FIG. 5 another inverter 22 and switching circuit 23 are provided for enabling the doppler radar only when the first vehicle is halted. Therefore, when the first vehicle travels, the doppler radar cannot function (disabled). The output terminal of the switching circuit 23 is connected to a power switch of the doppler radar module 1 so that the output signal from the switching circuit 23 turns the power switch on or off. Consequently, during the travel of the first vehicle, an electric wave interference with another electric wave transmitting and receiving apparatus can be prevented and unnecessary alarm can be prevented.

Figure 9:
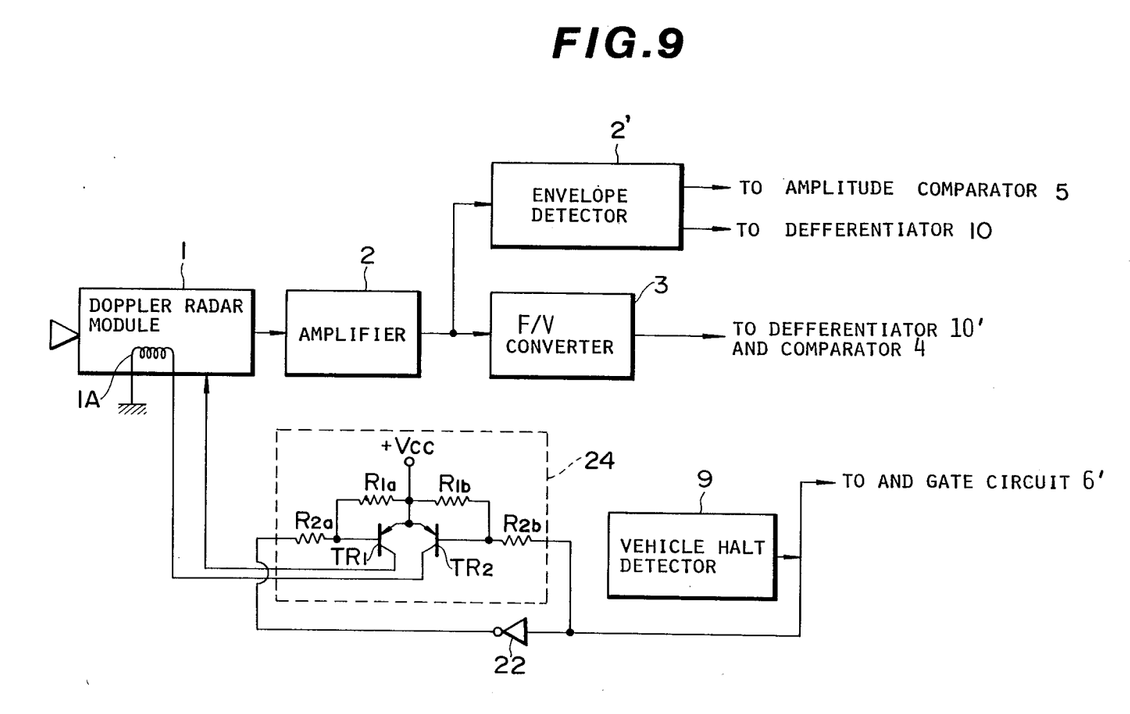
FIG. 9 shows a circuit block diagram of the doppler radar moving obstacle detection system in a fifth preferred embodiment according to the present invention.

FIG. 9 shows a fifth preferred embodiment of the doppler radar moving obstacle detection system.

As shown in FIG. 9, the structural difference from that shown in FIG. 5 is the switching circuit and connection of the switching circuit to the doppler radar module 1.

A second switching circuit 24 comprises an emitter-coupled differential amplifying circuit having two PNP transistors $TR_1$ and $TR_2$ and four resistors $R_{1a}$, $R_{1b}$, $R_{2a}$, and $R_{2b}$. The base of the first transistor $TR_1$ is connected to the inverter 22 via the second resistor $R_{2a}$. The base of the second transistor $TR_2$ is connected to the vehicle halt detector 9 via the complementary second resistor $R_{2b}$. The emitters of both transistors $TR_1$ and $TR_2$ are connected to a positive power supply. The collector of the second transistor $TR_2$ is connected to a heating element 1A (or resistor) of a gunn oscillator provided within the doppler radar to maintain a stable microwave oscillation even when the gunn oscillator is cooled. The collector of the first transistor $TR_1$ is connected to the power switch of the doppler radar module 1. Therefore, the heating element 1A receives the high-level voltage from the second transistor $TR_2$ during the travel of the first vehicle to heat the gunn oscillator. However, the power switch of the doppler radar module 1 is turned off. When the vehicle is halted, the power switch of the doppler radar module 1 is turned on, with the heating element 1A being turned off.

Figure 10:
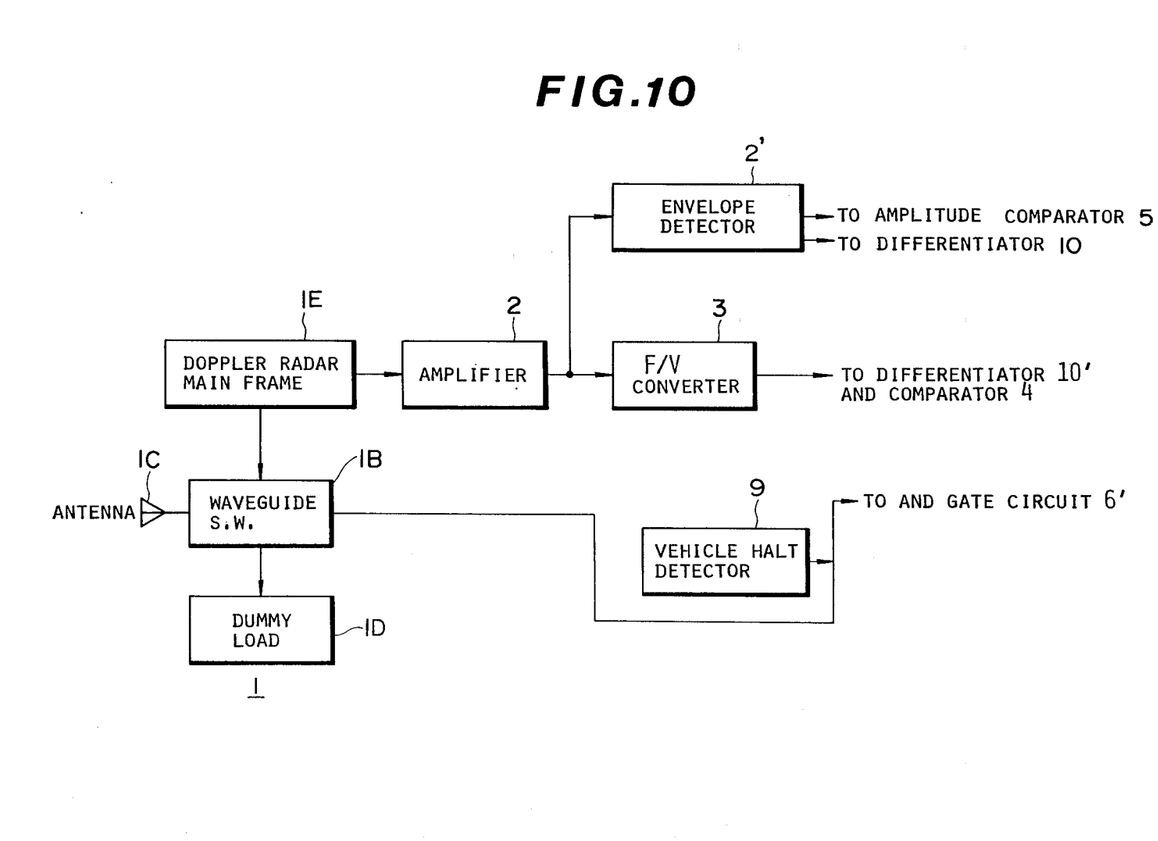
FIG. 10 shows a circuit block diagram of the doppler radar moving obstacle detection system in a sixth preferred embodiment according to the present invention.

FIG. 10 shows a sixth preferred embodiment of the doppler radar moving obstacle detection system according to the present invention.

In this preferred embodiment, the vehicle halt detector 9 is connected directly to a waveguide switch 1B of the doppler radar module 1. Therefore, when the first vehicle is halted, the output high-level voltage signal is sent into the waveguide switch 1B so as to transmit the electric wave signal generated from the gunn oscillator within a doppler radar module main frame 1E through the antenna 1C. When the vehicle travels, the waveguide switch 1B is turned off since no voltage signal is received from the vehicle halt detector 9 so that the electric wave signal from the gunn oscillator is sent into a dummy load 1D as a nonreflective terminator. Therefore, the oscillation operation of the gun oscillator is not interrupted when the vehicle travels. Consequently, a stable oscillation of the gun oscillator can be achieved at all times. Alternatively, a PIN switch may be provided between the gunn oscillator within the doppler radar module main frame 1E and antenna 1C in place of the wave guide switch 1B and dummy load 1D in order to reduce the dimension and cost of the system.

As described hereinbefore, the doppler radar moving obstacle detection system can inform that another vehicle in front detection area of the first vehicle has departed or another vehicle has approached the front area of the first vehicle. The system can also distinguishedly inform the vehicle driver and/or other adjacent vehicle drivers that a pedestrian is presently going across his vehicle for preventing a traffic accident. Such a information described above is made, e.g., only when the vehicle halts.

It will be fully appreciated by those skilled in the art that the foregoing description is in terms of preferred embodiments of the present invention wherein various changes and modifications may be made without departing from the spirit and scope of the present invention, which is to be defined by the appended claims.

What is claimed is:

1. A moving obstacle detection system for an automotive vehicle, which comprises:
    (a) a doppler radar unit which operatively transmits a wave having a fixed frequency toward a forward direction of the vehicle when the vehicle halts, receives the reflected wave from a moving obstacle in front of the vehicle, and outputs a doppler signal having a frequency corresponding to the frequency difference between the transmitted and reflected waves and an amplitude which changes according to the distance between the vehicle and moving obstacle;
    (b) a first means responsive to the doppler signal from said doppler radar unit for determining whether the frequency of the doppler signal exceeds a first predetermined value so as to detect the approach or departure of a moving obstacle toward or away from the vehicle;
    (c) a second means responsive to the doppler signal for determining whether the duration of the amplitude level of the doppler signal which exceeds a second predetermined value exceeds a predetermined interval of time so as to distinguish the approach or departure of the moving obstacle toward or away from the vehicle from the movement of an obstacle transverse to the vehicle direction; and
    (d) an alarm unit which produces an alarm in a predetermined form when said first means determines that the frequency of the doppler signal exceeds the first predetermined value and said second means determine that the duration exceeds the predetermined interval of time,
    whereby said alarm unit produces the alarm only when another vehicle approaches toward the forward direction of the vehicle or departs away from the vehicle.

2. A moving obstacle detection system as set forth in claim 1, wherein said first means comprises:
    (a) a frequency-to-voltage converter connected to said doppler radar unit which converts the frequency of the doppler signal into a corresponding voltage; and
    (b) a voltage comparator connected to said frequency-to-voltage converter which compares the voltage fed from said frequency-to-voltage converter with a reference voltage and outputs a voltage signal into said alarm unit, said the alarm unit responsive to said voltage signal for producing the alarm when the voltage from said frequency to voltage converter exceeds the reference voltage.

3. A moving obstacle detection system as set forth in either claim 1, wherein said second means comprises:
    (a) an amplitude detector which receives the doppler signal and produces an one-directional envelope corresponding to each amplitude of the doppler signal;
    (b) a amplitude comparator which receives the envelope from said amplitude detector, compares the amplitude level of the doppler signal with a reference voltage corresponding to predetermined value and outputs a voltage signal when the amplitude level exceeds the second predetermined value; and
    (c) a time interval discriminator connected to said amplitude comparator which outputs a voltage signal into said alarm unit so as to produce the alarm only when the duration of the voltage signal received from said amplitude comparator exceeds the predetermined interval of time.

4. A moving obstacle detection system as set forth in claim 3, wherein said alarm unit includes a first AND gate circuit at the input terminal thereof which is connected to both first and second judging means.

5. A moving obstacle detection system as set forth in claim 3, wherein said time interval discriminator comprises:
    (a) a first monostable multivibrator which outputs a voltage signal for the predetermined interval of time, responsive to the rising edge of the voltage signal from said amplitude comparator;
    (b) a first inverter connected to said first monostable multivibrator; and
    (c) an AND gate circuit connected to said inverter and to said amplitude comparator which enables the passage of the high-level voltage signal from said amplitude comparator to said alarm unit only when the duration of the high-level voltage signal from said amplitude comparator exceeds the duration of the output high-level voltage signal of said first monostable multivibrator.

6. A moving obstacle detection system as set forth in claim 1, wherein the predetermined interval of time by said second means is approximately three seconds.

7. A moving obstacle detection system as recited in claim 1 wherein said doppler radar unit comprises means for transmitting the wave having a fixed frequency in the forward direction of the vehicle only when the vehicle is halted.

8. A moving obstacle detection system as recited in claim 7 wherein said means for transmitting said wave only when the vehicle is halted comprises vehicle halt detecting means for detecting a halted state of the vehicle and for outputting a voltage signal indicating that the vehicle is halted, and switching means for temporarily stopping transmission of the wave when said vehicle halt detecting means provides no output signal indicative of the halted state of the vehicle.

9. A moving obstacle detection system for an automotive vehicle, which comprises:
    (a) a doppler radar unit which transmits a wave having a fixed frequency toward a forward direction of the vehicle when the vehicle is halted, receives the reflected wave from a moving obstacle, and amplifies and outputs a doppler signal having a frequency corresponding to the frequency difference between the transmitted and reflected waves and an amplitude which changes according to the distance between the vehicle and moving obstacle;
(b) a first means which receives the doppler signal from said doppler radar unit for determining whether the frequency of the doppler signal exceeds a first predetermined value so as to detect the approach or departure of an obstacle toward or from the vehicle;
(c) an interval of time setting means which, responsive to the doppler signal from said doppler radar unit, outputs a voltage signal having a first predetermined duration when the amplitude of the doppler exceeds a predetermined threshold value for discriminating the approach or departure from the vehicle and the traversed intersection of a moving obstacle;
(d) a vehicle halt detector which detects the halt state of the vehicle and outputs a voltage signal indicating the vehicle is halted; and
(e) an alarm unit which produces the alarm in a predetermined form to indicate the vehicle driver that an obstacle is approaching or departing from the vehicle when said first means determines that the frequency of the doppler signal exceeds the first predetermined value during the receipt of the voltage signal from said interval of time setting means, and said vehicle halt detector outputs the voltage signal thereinto.

10. A moving obstacle detection system as set forth in claim 9, wherein said interval of time setting means comprises:
(a) an amplitude comparator connected to said doppler radar unit which outputs a first pulse signal whenever the amplitude of the amplified doppler signal exceeds the predetermined threshold value thereof;
(b) a retriggerable monostable multivibrator which outputs a second pulse signal having a second predetermined duration in response to the rising edge of the first pulse signal from said amplitude comparator; and
(c) a second monostable multivibrator which outputs the voltage signal of the first predetermined duration in response to the rising edge of the second pulse signal from said retriggerable monostable multivibrator, the second predetermined duration of said second pulse signal being longer than the first predetermined duration of said voltage signal.

11. A moving obstacle detection system as set forth in claim 9, wherein said interval of time setting means comprises:
(a) an amplitude detector which receives the doppler signal from said doppler radar unit and produces a one-directional envelope corresponding to each amplitude of the amplified doppler signal;
(b) an amplitude comparator which, responsive to the envelope from said amplitude detector, compares the amplitude level of the doppler signal with a predetermined threshold value and outputs a second pulse signal when the amplitude level of the envelope exceeds the predetermined threshold value; and
(c) a second monostable multivibrator which outputs the voltage signal of the first predetermined duration in response to the rising edge of the second pulse signal from said amplitude comparator, the duration of said second pulse signal from said amplitude comparator being longer than the first predetermined duration of the voltage signal outputted from said second monostable multivibrator.

12. A moving obstacle detection system as set forth in claim 9, wherein said interval of time setting means comprises:
(a) a two-threshold amplitude comparator which, responsive to the doppler signal, outputs a voltage signal whenever the amplitude of the doppler signal exceeds a first predetermined threshold value provided therein and also outputs a voltage signal whenever the amplitude level of the doppler signal exceeds a second predetermined threshold value provided therein, the second predetermined threshold value being higher than the first predetermined threshold value;
(b) a retriggerable monostable multivibrator which outputs a pulse signal whenever the voltage signal is received from said two-threshold amplitude comparator indicating the amplitude of the amplified doppler signal exceeds the first predetermined threshold value;
(c) a second monostable multivibrator which outputs the voltage signal of the first predetermined duration in response to the risng edge of the pulse signal from said retriggerable monostable multivibrator, the first predetermined duration of the voltage signal being shorter than the duration of the pulse signal from said retriggerable monostable multivibrator; and
(d) an AND gate circuit having two input terminals, one connected to said amplitude comparator and the other to said second monostable multivibrator, which enables the passage of the voltage signal from said two-threshold amplitude comparator indicating that the amplitude level of the amplified doppler signal exceeds the second predetermined threshold value only when the voltage signal from said second monostable multivibrator agrees with that from said two-threshold amplitude comparator.

13. A moving obstacle detection system as set forth in claim 9, which further comprises,
a second means which, responsive to the doppler signal from said doppler radar unit, determines whether the amplitude level changing rate of the doppler signal exceeds a third predetermined value provided therein during the reception of the voltage signal from said interval of time setting means so as to detect only the forward departure of another vehicle from the vehicle.

14. A moving obstacle detecting and informing system as set forth in claim 13, wherein said second means comprises:
(a) an amplitude detector which receives the doppler signal from said doppler radar unit and produces a one-directional envelope according to the amplitude level change of the doppler signal;
(b) a first differentiator which receives and differentiates the envelope produced by said amplitude detector so as to produce a signal whose level changes according to the changing rate of the amplitude level of the doppler signal with respect to time;
(c) a voltage comparator which receives the voltage signal from said first differentiator and compares the voltage signal with a reference voltage corresponding to the third predetermined value so as to detect whether the amplitude changing rate of the doppler signal exceeds the third predetermined value; and (d) an AND gate which receives a voltage signal from said voltage comparator when the amplitude changing rate of the doppler signal exceeds the third predetermined value and enable the passage of the voltage signal from said voltage comparator to said alarm unit when the voltage signal of the same level having the first predetermined duration is received from said interval of time setting means.

15. A moving obstacle detection system as set forth in claim 13, wherein said second means comprises:

(a) a switching unit which enables the passage of the amplified doppler sigal from said doppler radar unit therethrough when the voltage signal having the first predetermined duration is received from said interval of time setting means;

(b) an amplitude detector which receives the doppler signal from said doppler radar unit through said switching unit and produces a one-directional envelope according to the amplitude level change of the doppler signal;

(c) a first differentiator which receives and differentiates the envelope produced by said amplitude detector so as to produce a signal whose level changes according to the changing rate of the amplitude level of the doppler signal with respect to time; and (d) a voltage comparator which receives the voltage signal from said first differentiator and compares the voltage signal with a reference voltage corresponding to the third predetermined value so as to detect whether the amplitude changing rate of the doppler signal exceeds the third predetermined value.

16. A moving obstacle detection system as set forth in claim 9, wherein the duration of the output signal of said interval of time setting means is about 0.2 seconds.

17. A moving obstacle detection system for an automotive vehicle, which comprises:

(a) a doppler radar unit which transmits a wave having a fixed frequency toward a forward direction of the vehicle, receives reflected waves reflected from a moving obstacle, and outputs a doppler signal having a frequency corresponding to a frequency difference between the transmitted and reflected waves and an amplitude whch changes according to the distance between the vehicle and moving obstacle when the vehicle is halted;

(b) a first means, responsive to the doppler signal from said doppler radar unit for determining whether the frequency of the doppler signal exceeds a first predetermined value so as to detect the approach or departure of a moving obstacle toward or from the vehicle;

(c) a second means, responsive to the doppler signal from said doppler radar unit for determining whether a frequency changing rate or amplitude level changing rate of the dopler signal exceeds a second predetermined value so as to detect approach or departure of a moving obstacle toward or from the vehicle;

(d) a third means which, responsive to said doppler signal, outputs a voltage signal when an interval of time predetermined therein exceeds an interval of time during which the doppler signal appears for a single moving obstacle so as to detect an intersection of another vehicle transverse to the vehicle;

(e) a vehicle halt detector which detects the halted state of the vehicle and outputs a voltage signal indicating that the vehicle is halted;

(f) a first alarm unit which produces an alarm urgently in a predetermined form when the voltage signal from said third means is received or when said first means determines that the frequency of the doppler signal exceeds the first predetermined value, with the output voltage signal from said vehicle halt detector received and with said second means determining that neither the frequency changing rate nor the amplitude level changing rate exceed the second predetermined value;

(g) a second alarm unit which produces an alarm in another predetermined form when said first means determines that the frequency of the doppler signal exceeds the first predetermined value with the output voltage signal from said vehicle halt detector received and with said second means determining that either the frequency changing rate or the amplitude level changing rate exceeds the second predetermined value; and (h) a doppler radar unit switching unit which temporarily halts the transmission of the wave from said doppler radar unit when said vehicle halt detector outputs no voltage signal.

18. A moving obstacle detection system as set forth in claim 17, wherein said doppler radar unit as a gunn oscillator and a heating element for warming the gunn oscillator so as to provide a stable oscillation of the gunn oscillator and said doppler radar unit switching means turns off the power of said doppler radar unit with said heating element turned on when said vehicle halt detector outputs no voltage signal.

19. A moving obstacle detection system as set forth in claim 17, wherein said doppler radar unit has a waveguide switch and dummy load, said waveguide switch connecting a mainframe of said doppler radar unit having a gunn oscillator to an antenna when said vehicle halt detector outputs the voltage signal and to said dummy load when said vehicle halt detector outputs no voltage signal.

20. A moving obstacle detection system as set forth in claim 17, which further comprises a third alarm unit connected to said third means which produces an alarm in a predetermined form so as to indicate to another vehicle driver at a different traffic lane and/or at the rear of the vehicle that a pedestrian goes across the vehicle.

21. A moving obstacle detection system as set forth in claim 17 further comprising amplifying means for amplifying the doppler signal from said doppler radar unit and for providing the amplified signal to said second means.

* * * * *